United States Patent
Endsley et al.

(10) Patent No.: US 9,521,351 B1
(45) Date of Patent: Dec. 13, 2016

(54) FRACTIONAL-READOUT OVERSAMPLED IMAGE SENSOR

(71) Applicant: Rambus Inc., Sunnyvale, CA (US)

(72) Inventors: Jay Endsley, San Jose, CA (US); Thomas Vogelsang, Mountain View, CA (US); Craig M. Smith, Spencerport, NY (US); Michael Guidash, Rochester, NY (US); Alexander C. Schneider, Los Altos, CA (US)

(73) Assignee: Rambus Inc., Sunnyvale, CA (US)

(*) Notice: Subject to any disclaimer, the term of this patent is extended or adjusted under 35 U.S.C. 154(b) by 0 days.

(21) Appl. No.: 14/995,138

(22) Filed: Jan. 13, 2016

Related U.S. Application Data

(60) Provisional application No. 62/221,421, filed on Sep. 21, 2015, provisional application No. 62/268,438, filed on Dec. 16, 2015.

(51) Int. Cl.
*H04N 5/378* (2011.01)
*H04N 5/355* (2011.01)
*H04N 5/235* (2006.01)
*H04N 5/353* (2011.01)

(52) U.S. Cl.
CPC ............ *H04N 5/378* (2013.01); *H04N 5/2355* (2013.01); *H04N 5/3532* (2013.01); *H04N 5/35536* (2013.01)

(58) Field of Classification Search
None
See application file for complete search history.

(56) References Cited

U.S. PATENT DOCUMENTS

| | | | |
|---|---|---|---|
| 7,323,671 B1 | 1/2008 | Toros et al. | |
| 7,391,453 B2 | 6/2008 | Ohkawa | |
| 7,612,819 B2 | 11/2009 | Nam | |
| 7,663,683 B2* | 2/2010 | Miyatake | H01L 27/14609 348/300 |
| 8,144,215 B2 | 3/2012 | Lin | |
| 8,159,587 B2 | 4/2012 | Deschamps et al. | |
| 8,222,709 B2* | 7/2012 | Oike | H04N 5/335 257/225 |
| 8,253,090 B2* | 8/2012 | Barbier | H04N 5/2355 250/208.1 |
| 8,675,103 B2 | 3/2014 | Cieslinski | |

(Continued)

OTHER PUBLICATIONS

Koifman, Vladimir, "Noiseless Frame Summation in CMOS Sensors" bog post published on Image Sensors World Nov. 25, 2015, downloaded on Dec. 9, 2015 from http://image-sensors-world.blogspot.com/2015/11/noiseless-frame-summation-in-cmos.html. 30 pages.

*Primary Examiner* — Michael Osinski
(74) *Attorney, Agent, or Firm* — Charles Shemwell

(57) ABSTRACT

Signals representative of total photocharge integrated within respective image-sensor pixels are read out of the pixels after a first exposure interval that constitutes a first fraction of a frame interval. Signals in excess of a threshold level are read out of the pixels after an ensuing second exposure interval that constitutes a second fraction of the frame interval, leaving residual photocharge within the pixels. After a third exposure interval that constitutes a third fraction of the frame interval, signals representative of a combination of at least the residual photocharge and photocharge integrated within the pixels during the third exposure interval are read out of the pixels.

14 Claims, 10 Drawing Sheets

(56) References Cited

U.S. PATENT DOCUMENTS

| | | | |
|---|---|---|---|
| 9,001,251 B2* | 4/2015 | Smith | H01L 27/14641 |
| | | | 257/290 |
| 9,036,065 B1 | 5/2015 | Vogelsang | |
| 9,264,633 B2* | 2/2016 | Bae | H04N 5/355 |
| 9,264,639 B2* | 2/2016 | Guidash | H04N 5/374 |
| 2005/0083421 A1* | 4/2005 | Berezin | H04N 3/155 |
| | | | 348/308 |
| 2007/0096238 A1* | 5/2007 | Oike | H04N 3/155 |
| | | | 257/443 |
| 2008/0018766 A1* | 1/2008 | Miyatake | H01L 27/14609 |
| | | | 348/308 |
| 2008/0252742 A1* | 10/2008 | Oike | H04N 5/3741 |
| | | | 348/222.1 |
| 2008/0303928 A1* | 12/2008 | Kusuda | H04N 3/1568 |
| | | | 348/300 |
| 2009/0127438 A1* | 5/2009 | Barbier | H04N 5/335 |
| | | | 250/208.1 |
| 2010/0188540 A1* | 7/2010 | Bechtel | H04N 5/378 |
| | | | 348/302 |
| 2011/0013065 A1* | 1/2011 | Shinohara | H04N 5/335 |
| | | | 348/302 |
| 2011/0101420 A1* | 5/2011 | Patel | H01L 27/14609 |
| | | | 257/225 |
| 2011/0279721 A1* | 11/2011 | McMahon | H04N 5/345 |
| | | | 348/302 |
| 2011/0279722 A1 | 11/2011 | Cieslinski et al. | |
| 2012/0127354 A1 | 5/2012 | Cieslinski | |
| 2012/0305751 A1* | 12/2012 | Kusuda | H04N 5/35509 |
| | | | 250/208.1 |
| 2014/0313337 A1 | 10/2014 | Devota et al. | |
| 2015/0200229 A1 | 7/2015 | Rotte et al. | |
| 2015/0229859 A1 | 8/2015 | Guidash et al. | |
| 2015/0281613 A1* | 10/2015 | Vogelsang | H04N 5/35545 |
| | | | 348/300 |
| 2015/0350582 A1* | 12/2015 | Korobov | H04N 5/378 |
| | | | 348/302 |
| 2015/0350584 A1* | 12/2015 | Fenigstein | H04N 5/355 |
| | | | 250/208.1 |
| 2015/0373290 A1* | 12/2015 | Vogelsang | H04N 5/378 |
| | | | 348/302 |
| 2016/0005785 A1* | 1/2016 | Barbier | H04N 5/3594 |
| | | | 250/208.1 |
| 2016/0118424 A1* | 4/2016 | Guidash | H01L 27/14614 |
| | | | 250/208.1 |

* cited by examiner

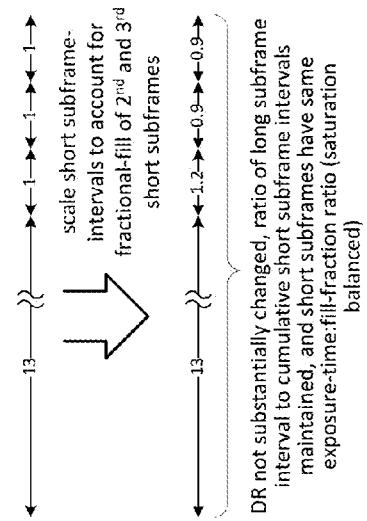
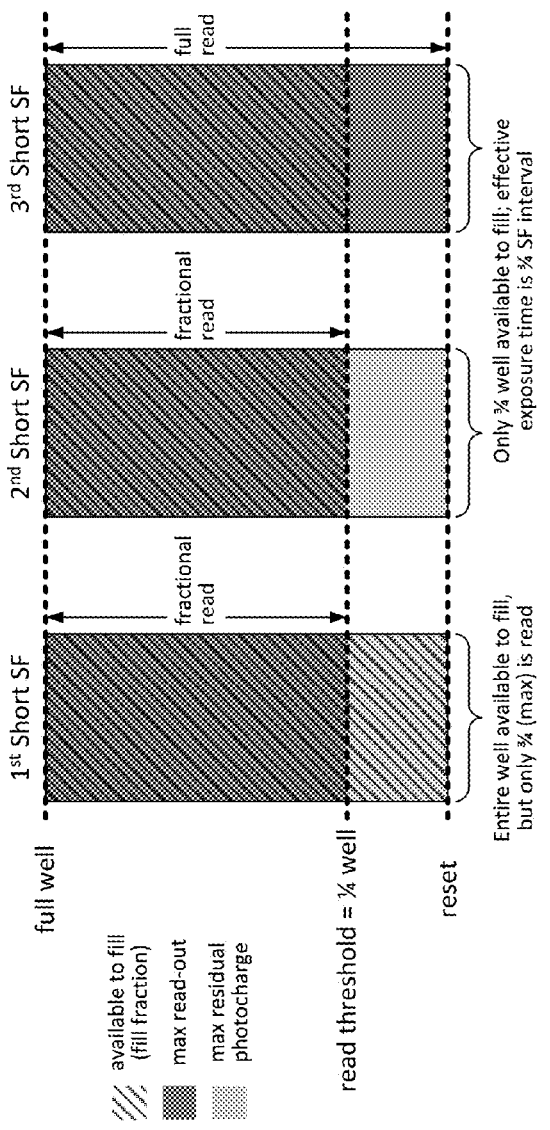

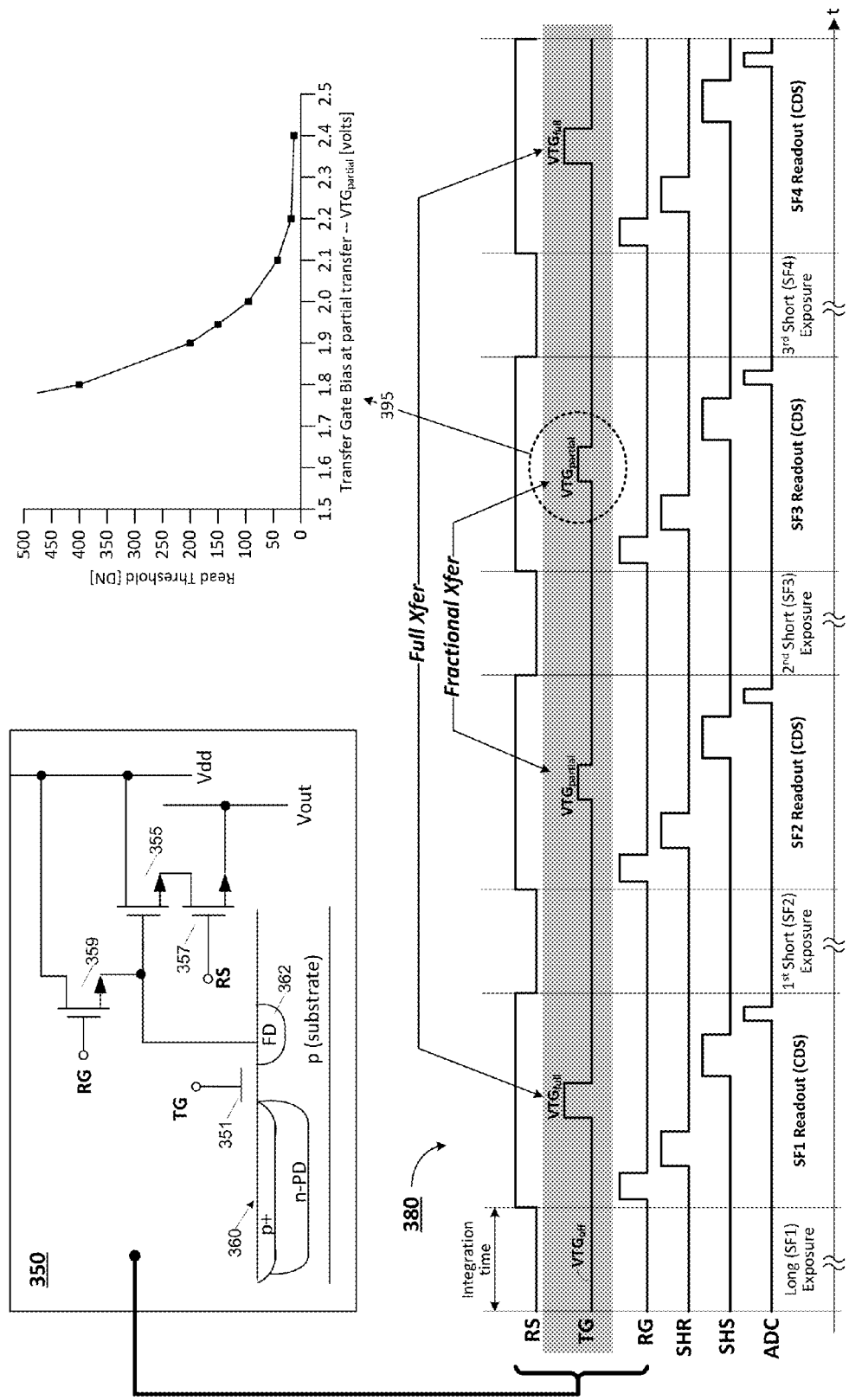

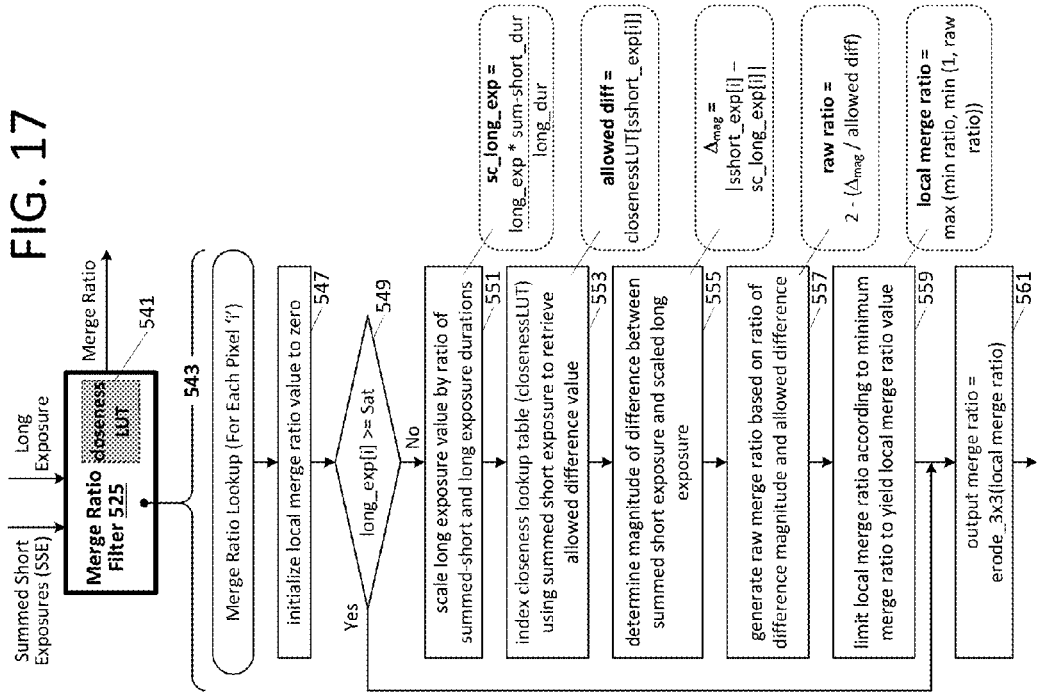
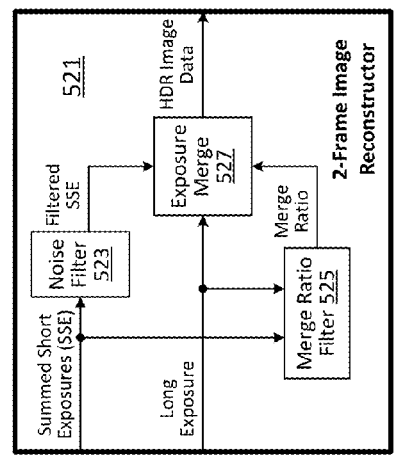
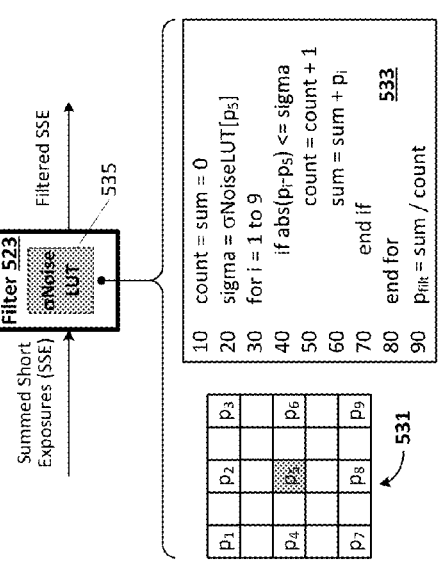

FRACTIONAL-READOUT OVERSAMPLED IMAGE SENSOR

CROSS-REFERENCE TO RELATED APPLICATIONS

This application hereby claims priority to and incorporates by reference each of the following U.S. Provisional Patent Applications:

Application No. Filing Date Title
62/221,421 21 Sep. 2015 Fractional-Readout Oversampled Image Sensor
62/268,438 16 Dec. 2015 Fractional-Readout Oversampled Image Sensor

TECHNICAL FIELD

The present disclosure relates to the field of integrated-circuit image sensors.

DRAWINGS

The various embodiments disclosed herein are illustrated by way of example, and not by way of limitation, in the figures of the accompanying drawings and in which like reference numerals refer to similar elements and in which:

FIG. 4 illustrates additional considerations with respect to the fractional readout approach discussed in reference to FIGS. 3A and 3B;

FIG. 5 illustrates a subframe duration scaling approach in which the durations of the short subframes are adjusted in a way that maintains the desired ratio of the cumulative short subframe interval to the long subframe interval while also effecting short subframe ratios that compensate for the effective short-subframe photo-well disparities;

FIG. 11 illustrates an exemplary 4T pixel that may constitute one of many millions of such units in a pixel array of an image sensor and to which the fractional readout techniques discussed above may be applied;

FIG. 15 illustrates an embodiment of a two-frame image reconstruction engine that may be used to implement two-frame reconstruction engine shown in FIGS. 6 and 7;

FIG. 16 illustrates an exemplary embodiment of the noise filter applied to the summed short exposures within the two-frame image reconstruction engine of FIG. 15;

FIG. 17 illustrates an embodiment of the merge ratio filter logic within the two-frame image reconstruction engine of FIG. 15;

Figure 19:
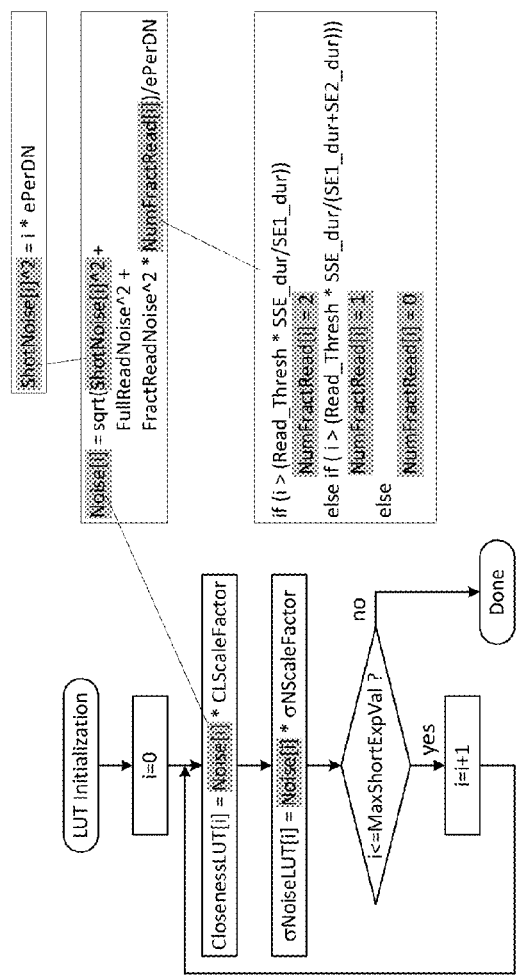
Figure 18:
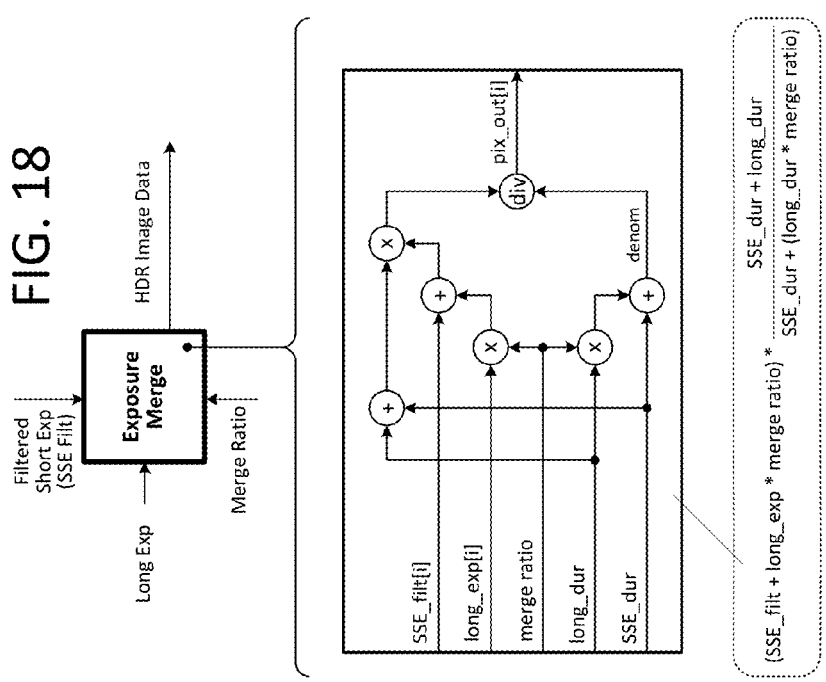

FIG. 18 illustrates an exemplary exposure merge operation carried out using the filtered short exposure value and long exposure value and the merge ratio value from the merge ratio filter logic of FIG. 17; and FIG. 19 illustrates an exemplary sequence of operations executed to initialize the closeness lookup table and sigma-noise lookup table within the two-frame reconstruction engine shown in FIG. 15.

DETAILED DESCRIPTION

In various embodiments disclosed herein, the pixel array of an integrated-circuit image sensor is readout multiple times per frame interval to generate respective subframe readout results that include at least (i) a non-final "full" readout result that corresponds to the total photocharge accumulated within the pixel array during a first non-final subframe interval, (ii) a "fractional" readout result that corresponds to a fractional portion of photocharge accumulated within the pixel array during a second non-final subframe interval that occurs later than the first non-final subframe interval, and (iii) a final full readout result that corresponds to the total photocharge accumulated within the pixel array during a final subframe interval plus the remainder of the photocharge accumulated during the non-final subframe interval.

Figure 1:
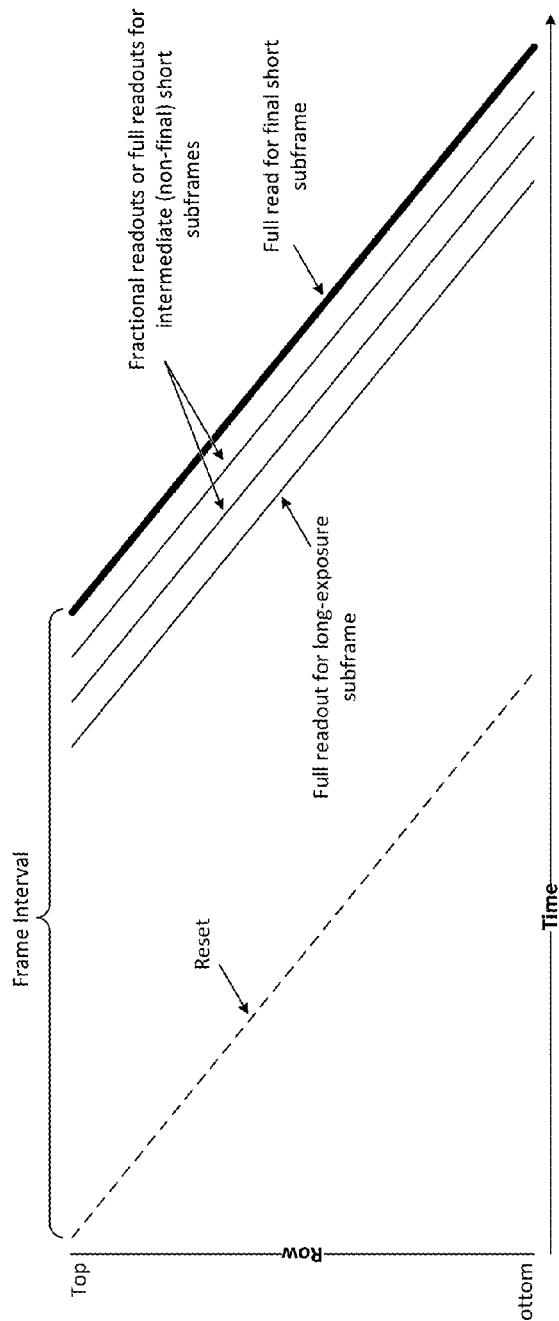
FIG. 1 illustrates an exemplary exposure profile for a fractional-readout image sensor that is subject to multiple subframe exposures and corresponding rolling-shutter readouts per frame interval.

FIG. 1 illustrates an exemplary exposure profile for a fractional-readout image sensor that is subject to multiple subframe exposures and corresponding rolling-shutter readouts per frame interval. In the particular example shown, the image sensor is initially exposed for a relatively long subframe interval (the "long subframe") and thereafter exposed for three relatively short subframe intervals of uniform duration (the "short subframes"). Because of their relatively short exposure durations, valid short subframe readouts may be obtained despite a scene brightness that will saturate the pixel array during the long subframe. Moreover, the cumulative duration of the multiple subframes—one long plus three short in this example—matches the image frame interval effecting a total exposure interval effectively the same as a conventional single-readout-per-frame image sensor. Accordingly, valid image data may be obtained even in bright light conditions that would otherwise saturate the pixel array if read out only once per frame, while the total exposure interval—and thus low light sensitivity—is maintained, effectively raising the dynamic range of the image sensor.

Still referring to FIG. 1, the fractional-readout image sensor may transition between "fractional" and "full" readout modes at least with respect to intermediate short subframes (i.e., the first and second short subframes in the example shown) either programmatically (e.g., according to user selection) or dynamically in response to scene lighting conditions. As discussed in greater detail below, in the full readouts executed at the conclusion of the initial long-exposure subframe and the final short subframe, photocharge accumulated within the pixel array is read out and cleared from the pixel array in its entirety while, in a fractional readout (also referred to herein as a "differential" readout or a "skimmed" readout), only that portion of the accumulated photocharge in excess of a "read" threshold is read out from and cleared from the pixel array, with the residual/remainder portion of the photocharge being maintained in the pixel array for eventual full readout at the end of the final subframe and thus at conclusion of the image frame interval.

Figure 2:
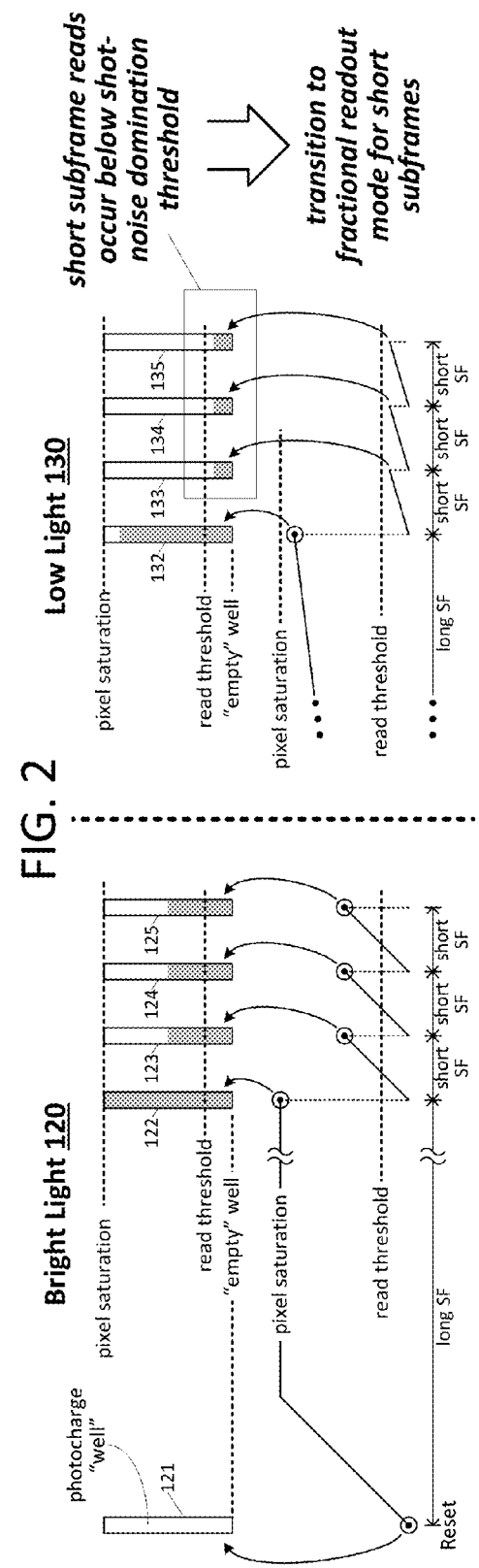
FIG. 2 illustrates noise considerations bearing on full subframe readouts during bright light and low light conditions.

FIG. 2 illustrates noise considerations bearing on full subframe readouts during bright light and low light conditions. For purposes of example, the same long subframe followed by three uniform-duration short subframe exposure policy shown in FIG. 1 is carried forward and depicted, in this case, in terms of photocharge fill-level within the photodiode "well" of a pixel. Various other subframe readout policies (i.e., relative durations of individual subframes, alternative ordering of the different subframes, varying degrees of concurrency in rolling-shutter subframe readouts, etc.) may be employed in alternative configurations and/or in response to particular lighting conditions.

Starting with the bright-light example at 120, the photodiode is reset at the start of a frame interval (e.g., by virtue of full-readout of the final subframe of a prior image frame interval) thus yielding the "empty" photocharge well or empty "photo-well" shown at 121—a baseline condition. Due to the relatively bright-light scene, the photo-well fills to a saturation point prior to the end of the long subframe exposure interval as shown at 122, and then fills to midrange levels during each of the three short subframe exposures 123, 124 and 125. In the full readout that follows each subframe exposure, photocharge accumulated within each image pixel is transferred in its entirety from the pixel's photodiode to a capacitive "floating diffusion" node or "readout" node. The floating diffusion node is itself coupled to readout circuitry (e.g., an amplifier coupled/biased in a source-follower configuration to yield a column output signal that tracks the floating diffusion potential) to produce a readout signal representative of the transferred photocharge. That is, each full readout operation clears all accumulated photocharge from the photodiode and thus effectively resets the photodiode (and pixel itself) to its baseline "empty-well" state.

Still referring to FIG. 2, the relatively bright-light readout signal exhibits a photon shot noise substantially higher than noise associated with the readout circuitry (i.e., noise on the floating diffusion node and in the readout path itself), so that the readout circuitry noise (or "readout noise") is effectively/statistically hidden in the larger shot noise. Quantifying this circumstance, the readout signal may be viewed as shot-noise dominated (e.g., shot noise 2× to 10× the readout noise or more) above a threshold signal level and thus above a threshold photocharge level referred to herein as the aforementioned "read threshold.".

Turning now to the low light example 130 shown in FIG. 2, the photo-well may or may not saturate in the long subframe (and indeed does not saturate in the depicted example at 132) and, more significantly from a noise perspective, the photocharge accumulated during the short subframes (133, 134, 135) may not exceed the read threshold. As a result, if full readouts are executed and summed for each of the short subframes, the readout noise component is incurred three times, causing the effective readout noise to be 1.73 (square-root of three) times the signal readout noise. Accordingly, this approach will produce an appreciable readout noise component and thus yield relatively a noisy low-light image. In this case, the image sensor may achieve superior low-light SNR by using (or transitioning to) fractional readout mode.

Figure 3A:
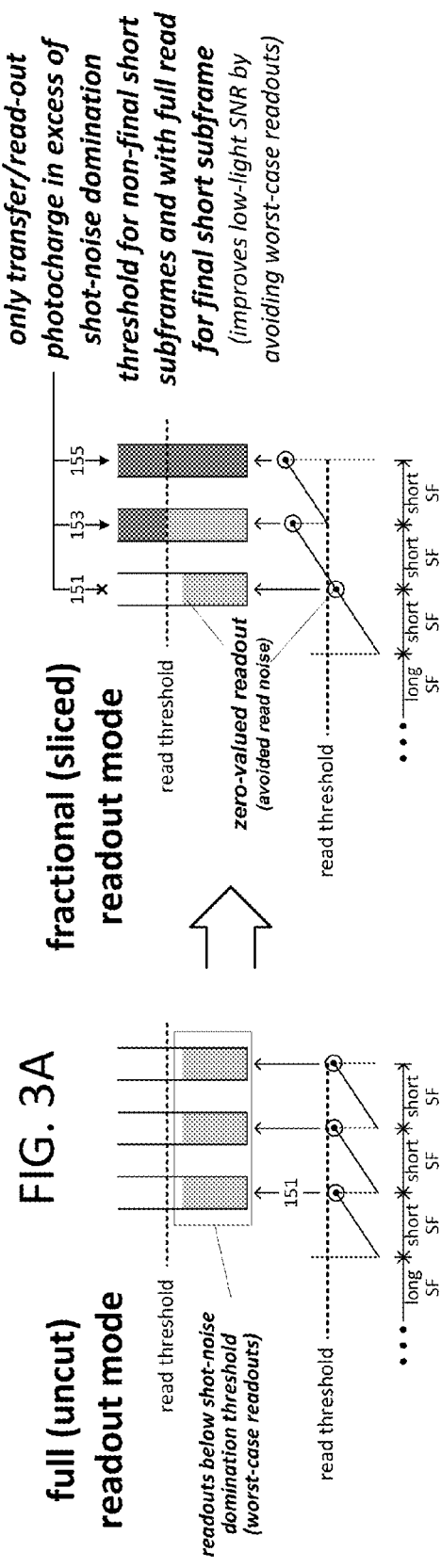
FIGS. 3A and 3B illustrate fractional or "sliced" readouts of the intermediate short subframes side-by-side with full readouts under the same lighting conditions.
Figure 3B:
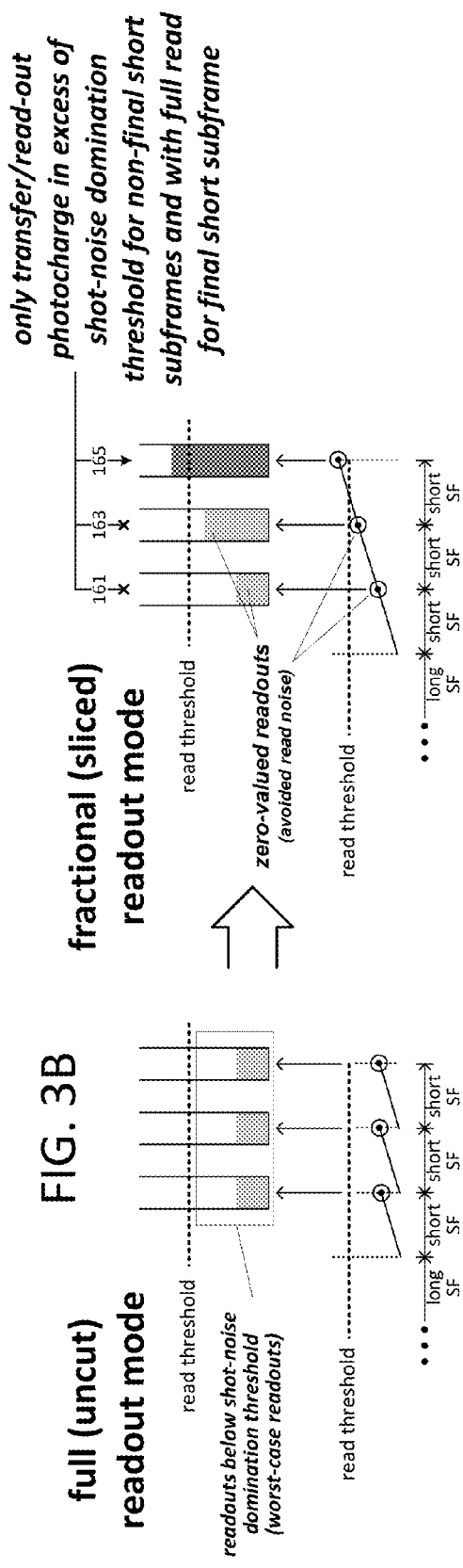

FIGS. 3A and 3B illustrate fractional or "sliced" readouts of the intermediate short subframes (i.e., all but the final short subframe are fractionally read out) side-by-side with full (or "uncut") readouts under the same lighting conditions. As explained in reference to FIG. 2, where short-exposure photocharge accumulation falls below the read threshold, full readouts of each short subframe exhibit substantial effective read noise and thus constitute worst-case readouts from an SNR perspective (i.e., may add noise without meaningful signal contribution). In the fractional readout approach, by contrast, one or more of these worst-case readouts are avoided by limiting the photocharge transfer (from photodiode to floating diffusion node) during intermediate short reads so that only that fraction of the accumulated photocharge in excess of the read threshold (i.e., photocharge level that will yield a pixel output signal in excess of a predetermined or programmable read threshold) is transferred from the photodiode to the floating diffusion node, leaving the remainder of the photocharge in the photodiode (i.e., in the photo-well). In the fractional-readout example of FIG. 3A, the light level is such that no photocharge transfer occurs within the subject pixel at the conclusion of the first short subframe (151), producing a zero-valued fractional read. The residual photocharge (i.e., photocharge remaining in the photodiode) from the first short subframe forms the starting point for charge accumulation in the second short subframe so that, at the exemplary light level shown, fractional readout of the second short subframe (153) yields a non-zero readout result corresponding to the dark-shaded (i.e., above-read-threshold) fraction of the accumulated photocharge. The residual photocharge from the second short subframe (i.e., photocharge level below the read threshold which includes photocharge accumulated during each of the first and second short subframes) forms the starting point for charge accumulation in the third short subframe which is fully read out at the end of the frame interval (155). The full readout of the third short subframe, when combined with the nonzero fractional readout of the second short subframe, corresponds to the total photocharge accumulated during the three short subframes, but is achieved exclusively with shot-noise dominated readouts. More specifically, noise may be avoided altogether in the first short subframe readout (e.g., by clamping any near-zero value readout result to zero as discussed below), and the readouts of each of the second and third short subframes yields signals above the read threshold, thus hiding read-noise within the higher shot noise of those signals.

FIG. 3B illustrates another example, in this case at a light-level so low that neither of the first two short subframes yield appreciable photocharge transfers (i.e., from photodiode to floating diffusion within the subject pixel), thus producing two zero-valued fractional read-out results (161, 163), while the final subframe readout reflects the signal level integrated for the cumulative duration of the three subframe intervals (in this case a signal level that exceeds the read threshold and thus again avoids higher read-noise from multiple readouts). By contrast, each of the subframe readouts in the uncut (full-readout) mode, include read-noise that increases the total noise of the final output.

FIG. 4 illustrates additional considerations with respect to the fractional readout approach discussed above. First, the effective photo-well capacity shrinks after the initial fractional readout as any residual charge (which may rise to the level of the read threshold) sets a new floor for photocharge accumulation (i.e., a new higher-charge starting point). Assuming that the read threshold is set to 25% of full well (higher or lower read thresholds may be used) and that the first short subframe yields a non-zero fractional readout, for example, then only 75% of the photo-well remains available to accumulate photocharge in the second and third short subframe intervals. In embodiments that sum short-subframe readout data, these non-uniform "effective" well capacities or "fill-fractions" (100% well for first short subframe, 75% for each of the second and third short subframes) may be equalized by non-uniformly scaling the short subframe durations and/or applying non-uniform gains (analog and/or digital) to generate respective short subframe contributions to the merged result.

FIG. 5 illustrates a subframe duration scaling approach in which the durations of the short subframes are adjusted in a way that maintains the desired ratio of the cumulative short subframe interval to the long subframe interval (i.e., 3-to-13 in the example shown), while also effecting short subframe ratios that compensate for the effective short-subframe photo-well disparities. That is, the 75%-to-100% effective photo-well ratio is compensated by setting the interval of the second short subframe and the third short subframe to be 75% of the first short subframe interval (i.e., 0.9-to-1.2)—relative subframe durations that will cause each of the short subframes to saturate at the same brightness level. Note that, in those cases where zero-valued readouts are generated in either of the first and second short subframes, the effective photo-well capacity for the remaining short subframe(s) is unknown. However, because the pixel saturation point will not (absent motion or change in scene brightness) be reached in any of those scenarios, the non-uniform subframe durations have no impact on the cumulative short subframe result—the individual short subframe results may be directly summed (after digital scaling as necessary to account for any non-uniformity in the analog readout gain) as discussed below.

Returning to FIG. 4, another aspect of the fractional readout approach is truncated output signal range in the first and second short subframes. That is, by limiting the photocharge transfer to that in excess of 25% full-well (i.e., setting the read threshold to 25% of full-well), the maximum possible output signal for the first and second short subframes—and thus the maximum ADC (analog-to-digital-conversion) result—is ~75% of the maximum possible output signal (and ADC result) for the third short subframe. Assuming a 10-bit ADC in which five digital values (digital numbers, DNs) are reserved for black levels and/or other purposes, and in which the read threshold is set to DN=250, then the third short subframe may produce a digital result between 0 and 1018, while the ~quarter-well read threshold will limit the readouts for the first and second subframes to a digital result between 0 and 768 (i.e., 1018–250=768). One consequence of this truncated ADC output is that, in theory, the ADC could yield a value above 768 (e.g., in extreme-bright conditions that drive the sensor into a nonlinear portion of the photocharge accumulation curve). In a number of embodiments, this result is avoided by either disabling ADC ramping (in the case of a single-slope ADC, for example) at a maximum value, or clamping fractional-readout ADC results at a predetermined or programmed saturation value slightly below the maximum (e.g., 750).

Figure 6:
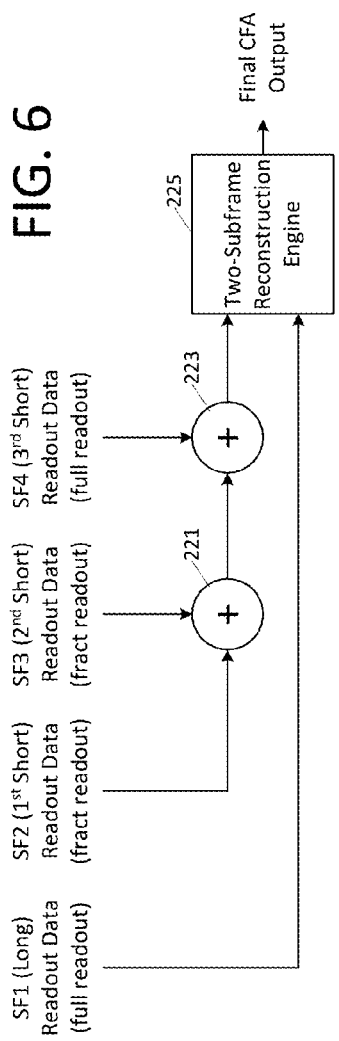
FIG. 6 illustrates an image frame reconstruction approach that may be implemented by logic circuitry on the image sensor die and/or a separate logic die.

FIG. 6 illustrates an image frame reconstruction approach that may be implemented by logic circuitry on the image sensor die and/or a separate logic die. As shown, digitized instances (i.e., ADC results) of each of the short subframe readouts (including fractional readouts in a fractional readout mode or full readouts in a full readout mode) are summed in adder circuits 221 and 223 to yield composite short-subframe readout data. That composite readout data (or sum-of-short-exposure (SSE) data is then combined with the full readout result of the initial long subframe in a two-frame reconstruction engine 225 to produce a final color-filter-array (CFA) output. For example, two-frame reconstruction engine 225 may discard saturated long subframe data, detect motion through data comparison of (and choose between) the short and long subframe results, blend the composite short readout result and long subframe result where no motion is detected, and so forth. A number of these operations may be impacted by fractional readout of intermediate short subframes as discussed in greater detail below.

Figure 7:
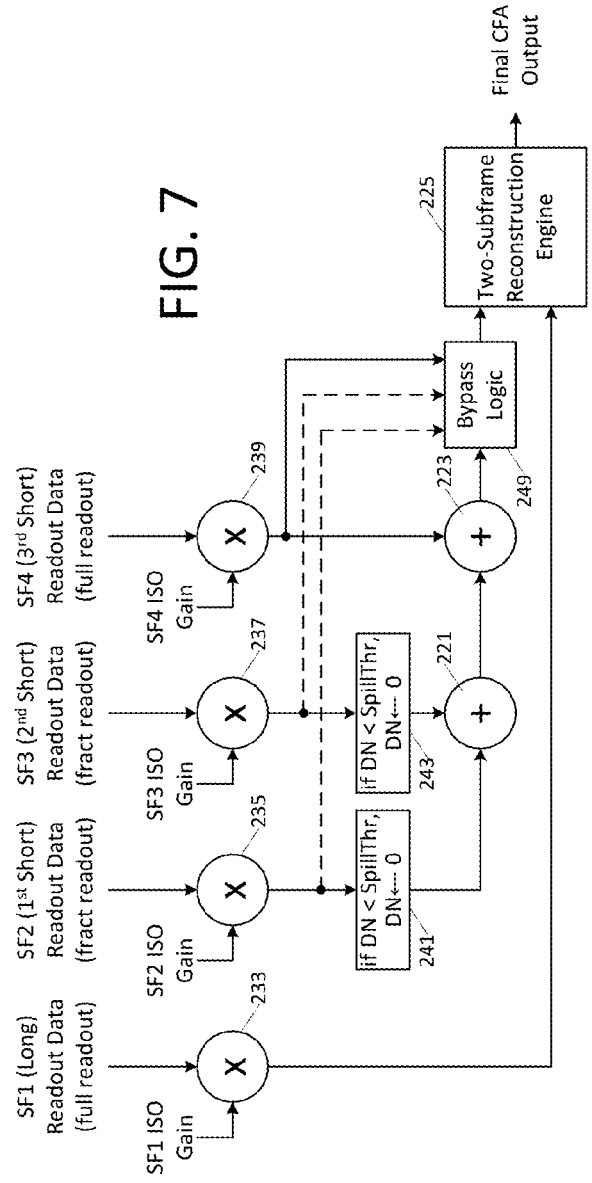
FIG. 7 illustrates an alternative image frame reconstruction approach in which digital gains are applied to one or more of the subframe results to compensate for any subframe-to-subframe non-uniformity in the analog readout path.

FIG. 7 illustrates an alternative image frame reconstruction approach in which digital gains are applied to one or more of the subframe results (i.e., via gain circuits 233, 235, 237, 239) to compensate for any subframe-to-subframe non-uniformity in the analog readout path (including non-uniform ADC gain, non-uniform programmable gain amplifier setting, etc.). Moreover, to limit noise associated with precisely determining whether photocharge level within a given pixel exceeds the read threshold, the reconstruction logic filters the raw fractional readout results to yield nonzero fractional readouts only where the raw readout result exceeds a fractional read-noise threshold referred to herein as a "spill" threshold. In the particular example shown, for instance, filter circuits 241 and 243 clamp any digitized fractional read result below the spill threshold (i.e., DN<SpillThr) to zero. As with the read threshold, the spill threshold and any other thresholds discussed herein may be calibrated at device startup, camera-function invocation, or in response to other events (e.g., passage of a given time interval, user instruction, etc.) and/or the values thereof programmed within a volatile or non-volatile configuration register implemented in the image sensor die. In general, the spill threshold is set to a level high enough to avoid false positives (i.e., where noise yields a nonzero fractional readout result despite below-read-threshold photocharge accumulation) and low enough to avoid false negatives (i.e., where the spill-threshold filtering would otherwise mask an above-read-threshold photocharge accumulation, resulting in lost photocharge in the total short subexposure tally).

Figure 8:
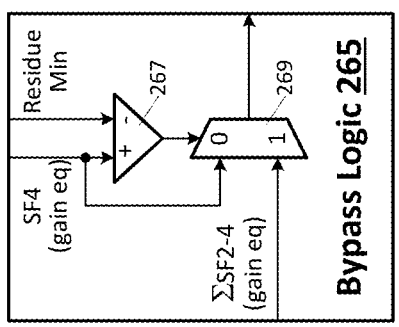
FIG. 8 illustrates a bypass logic embodiment having a comparator to compare the final subframe readout result with a minimum residue value.

Still referring to FIG. 7, the image reconstructor may also include bypass logic 249 that evaluates one or more of the subframe readout results to control information flow to the two-frame reconstruction engine. FIG. 8, for example, illustrates a bypass logic embodiment 265 having a comparator 267 to compare the final subframe readout result (after equalization within the digital gain compensation circuit such as circuit 239 of FIG. 7) with a minimum residue value ("Residue Min"). In one implementation or configuration, the minimum residue value corresponds to a minimum expected digital readout result for the final short subframe if either of the fractional readouts is nonzero. That is, if there was a nonzero fractional readout, then the final short subframe should yield a readout value at least as high as (or otherwise close to) the digital number corresponding to the read threshold, as that threshold reflects the residual fraction of the photocharge left in the photodiode of the subject pixel after fractional charge transfer and readout. Accordingly, if the final short subframe readout yields a value substantially below the digital number corresponding to the read threshold (i.e., read-threshold digital number less a programmable or predetermined margin of error), then it may be presumed that no read threshold exceedance has or should have occurred, so that the contributions from the first two short subframes (which should be zero) may be discarded. In the particular embodiment shown, for example, comparator 267 will yield a logic '0' causing multiplexer 269 to pass the gain-equalized final short subframe result (SF4) alone to the two-frame image reconstruction engine. Conversely, if the final short subframe readout value exceeds the residual-minimum threshold (i.e., comparator 267 yields a logic '1'), then multiplexer 269 will pass the summed (composite) short-subframe result to the two-frame image reconstruction engine. These heuristics can be performed on a pixel-wise basis (i.e., looking at only one pixel at a time to make a pixel-value discard decision), or neighboring pixels may also be considered to improve accuracy. For example, if a determination to discard the initial short subframes is produced for a predominant or threshold number of pixels within a local region, those discard decisions may be applied to discard the short subframe data for at least the pixels that yielded the discard decisions. By contrast, if the discard determinations are reached in only a small number of pixels within the local region (e.g., less than a threshold or predominant number), the discard decisions may be ignored and the combined subframe data passed to the two-frame reconstruction engine.

Figure 9:
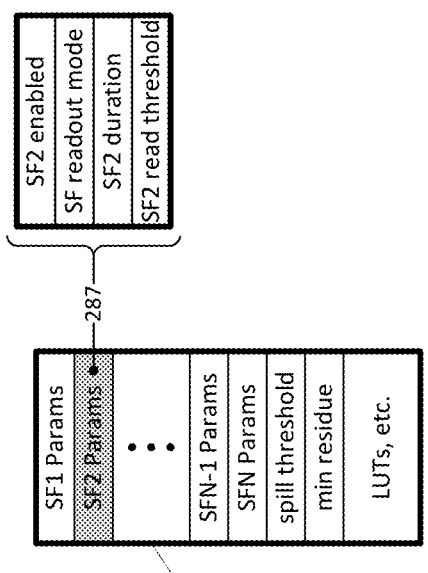
FIG. 9 illustrates a programmable register that may be included within a fractional-read image sensor to store control parameters for a number of sensor operations.

FIG. 9 illustrates a programmable register 285 that may be included within a fractional-read image sensor to store control parameters for a number of the sensor operations thus far described, including sub-frame specific parameters for up to N subframes, a spill threshold to be applied to fractional readouts as discussed in reference to FIG. 7, a minimum residue to be applied within the bypass logic of FIG. 8 and so forth. In one embodiment, illustrated in view 287, each of the programmable subframe parameter fields includes a number of sub-fields that specify, for each individual subframe, whether the subframe is enabled or disabled (i.e., thus enabling control over the total number of subframes), the subframe readout mode (e.g., full readout vs. fractional readout), the subframe duration, the read threshold to be applied for that subframe (i.e., if fractional readout mode is specified), etc. In alternative embodiments one or more subframe control parameters may be implied from others to reduce the total number of subframe programming fields. For example, the subframe-enable/disable status may be implied by the subframe duration field (e.g., duration=0 effectively disables the subframe) and the subframe readout mode may similarly be implied by the read threshold field (e.g., read threshold=0 implies full readout mode).

Continuing with FIG. 9, various other image sensor parameters may be controlled within other programmable fields not specifically shown, and various lookup tables (LUTs) employed in image reconstruction (e.g., as discussed below) may be implemented within programmable register 285. Programmable register 285 itself may be implemented by a relatively small addressable memory array (thus enabling flexible allocation or reallocation of sub-fields), by a register file or any other volatile or non-volatile circuit capable of storing programmable information supplied by a host processor or other control device.

Figure 10:
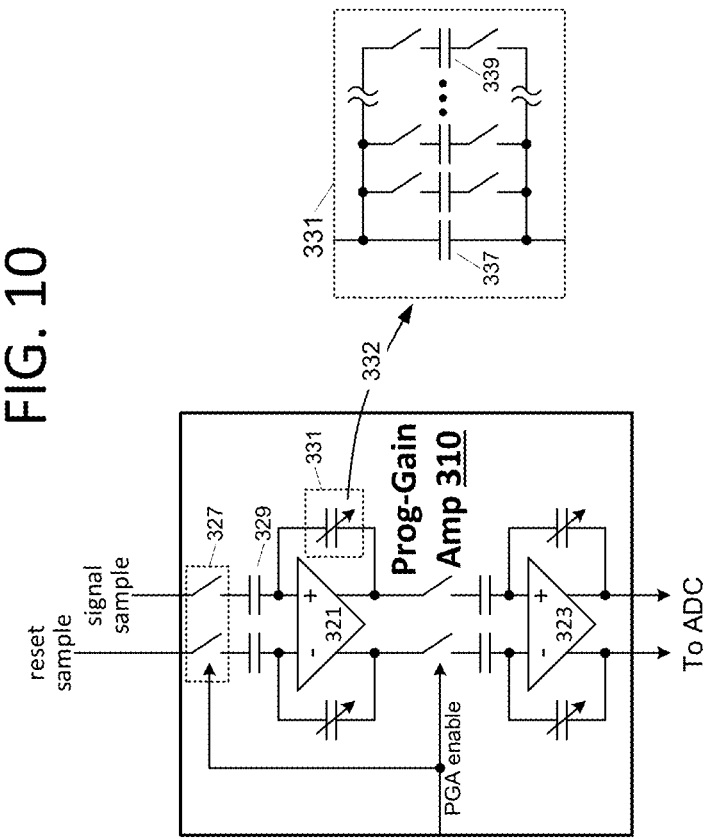
FIG. 10 illustrates an embodiment of a programmable gain amplifier that may be disposed within the column readout path to equalize the signal ranges between fractional and full readouts or otherwise implement variable gain in the signal readout path.

FIG. 10 illustrates an embodiment of a programmable gain amplifier 310 that may be disposed within the column readout path to equalize the signal ranges between fractional and full readouts or otherwise implement variable gain in the signal readout path. In the example shown, programmable gain amplifier 310 (PGA) includes two or more gain stages each formed by a capacitively coupled differential amplifier (321, 323) that applies a programmable gain according to the ratio of an input capacitance 329 and a feedback-coupled variable capacitance 331. In one implementation, shown in detail view 332, the variable capacitance element 331 is implemented by switchably coupling a variable number of component capacitive elements 339 in parallel with a minimum capacitance component 337 in accordance with a programmed setting. In one embodiment, the switchably-coupled component capacitive elements 399 are binary-weighted (capacitances=×1, 2×, 4×, 8×, etc.) to enable $2^R$ different capacitance settings in accordance with an R-bit control value. Alternatively, the component capacitive elements 337 and 339 (which may be implemented by passive or active components) may be thermometer coded, have matching capacitances or be implemented in any other arrangement that allows programmable gain amplifier 310 to meet a desired amplification range and resolution. Also, programmable gain amplifier 310 may be disabled by opening gain-stage switch elements 327 in response to deassertion of a PGA enable signal. Further, any of the gain stages (only two of which are shown) may be bypassed according to programmed gain settings to further extend the amplification range of the programmable gain amplifier. Note that various other programmable gain amplifier implementations may be used in alternative embodiments.

FIG. 11 illustrates an exemplary 4T pixel 350 that may constitute one of many millions of such units in a pixel array of an image sensor and to which the fractional readout techniques discussed above may be applied. In the depicted embodiment pixel cell 350 includes a pinned photodiode 360 and floating diffusion node 362 switchably coupled to one another via transfer gate 351. That is, an electrostatic barrier between photodiode 360 and floating diffusion node 362 may be varied according to the level of a transfer-gate control signal (TG) applied to transfer gate 351, the barrier being high enough to isolate the photodiode and floating diffusion node 362 from one another when TG is set to a logic low state (e.g., ground) or negative potential, and lowering to permit varying levels of charge transfer as TG is raised. While photodiode size (and thus photo-well capacity) may vary according to application needs, in a number of embodiments—particularly in image sensors intended for deployment within mobile phones or other relatively small, low power devices—photodiode size is limited to photo-well capacities of less than 7000 electrons (7000e⁻), 6000e⁻, or 5000e⁻, or even to capacities as small as 3000e⁻, 2500e⁻ or less.

Still referring to pixel 350, floating diffusion node 362 is coupled to the gate terminal of a source-follower transistor 355 (the in-pixel amplification element) and switchably coupled to Vdd via reset transistor 359 (with reset transistor being switched between conductive and non-conductive states according to the high/low state of a reset-gate control signal, RG). Source-follower transistor 355 is coupled in series with a read-select transistor 357 (i.e., having a gate terminal coupled to receive a read-select signal, RS) between Vdd and a column output line (Vout). Accordingly, when signal RS is raised to switch read-select transistor 357 on, and when the Vout line is biased by a current source, the potential on Vout rises and falls (i.e., follows) with the potential at the gate of source-follower transistor 355 and thus according to the potential on the floating diffusion node, thus producing/generating a pixel output signal representative of the voltage at the floating diffusion node. In general, the RG, TG and RS signals constitute row control signals conveyed on respective row control lines that are coupled in common (or in replicated instances) with the reset transistors 359, transfer gates 351 and read-select transistors 357 of an entire row of pixels within the pixel array. Separate sets of row control signals (RG, TG, RS) may be generated for each row of pixels in the pixel array, though, as discussed below in reference to FIG. 12, the reset transistor 359, source-follower transistor 355 and read-select transistor 357 may be shared among multiple pixels within the same column and/or row to form a multi-pixel cell or "pixel unit cell" (i.e., so that RG and RS signals are provided per row of pixel cells rather than per row of pixels).

FIG. 11 also illustrates an exemplary timing diagram 380 showing signals applied to achieve full photocharge transfer and readout for the first and final subframes of an image frame period and to achieve partial photocharge transfer and readout (i.e., fractional readout) for the intermediate short subframes. Note that the exposure intervals depicted in timing diagram 380 are generally orders of magnitude longer than the readout intervals and thus are not drawn to scale. Note also that the $VTG_{full}$ and $VTG_{partial}$ voltages applied to the transfer gates (351) within respective pixels of a RS-selected row of pixels may be generated on or off the image sensor and, in the latter case, calibrated to achieve full and fractional readouts. In the case of fractional readout calibration, for example, the $VTG_{partial}$ voltage (also referred to herein as $VTG_{fractional}$) may be iteratively adjusted during a calibration operation (carried out at initial power-up/camera-invocation, or on an ongoing basis) to yield a desired read-threshold DN (i.e., digital number representative of the read threshold) for the digitized pixel readout signal. That is, as generally shown at 395, the data-number (DN) representation of the read threshold can be adjusted by varying the transfer gate pulse magnitude (i.e., change in the transfer gate pulse amplitude and/or pulse width). Additionally, though the partial charge-transfer pulse magnitude (i.e., $VTG_{partial}$ pulse amplitude/pulse width) is shown as being uniform for the fractional-read subframes, the partial charge-transfer pulse magnitude can be varied from subframe to subframe in alternative embodiments (with each of the different partial-transfer voltages and/or pulse widths being run-time variable/adjustable, for example, through programmatic settings and/or adaptive adjustment).

Still referring to the timing diagram of FIG. 11, each of the subframe readouts follows a respective exposure and, in the embodiment shown, is effected through correlated double sampling. That is, as shown in each readout, the RG signal is pulsed to charge the floating diffusion node to a reset state and then, while the RS signal remains high (thus switching on read-select transistor 357 so that the column output voltage, Vout, is representative of the floating diffusion node potential) a reset-state sample-and-hold signal (SHR) is pulsed to capture the column output signal level within a sample-and-hold element. Shortly after capturing the reset-state sample, the TG line is pulsed (to the $VTG_{full}$ potential in the full-readout subframes SF1 and SF4, and to a lower $VTG_{partial}$ potential in the fractional-readout subframes SF2 and SF3) to effect charge transfer (full transfer in SF1/SF4, partial transfer in SF2/SF3) from photodiode 360 to floating diffusion node 362. Following the full or partial charge transfer, a signal-state sample-and-hold signal (SHS) is pulsed to capture the post-charge-transfer state of the floating diffusion node (i.e., as represented by the pixel output signal, Vout) within a signal-state sample-and-hold element. Thereafter, an ADC pulse is asserted to enable digitization of the difference between the signal-state and reset-state samples thereby yielding a digitized pixel value in which the reset-state value is, at least to some degree, canceled (i.e., as the reset-state of the floating diffusion node is theoretically present in both the reset-state and signal-state samples). In alternative embodiments, some of which are discussed below, sample-and-hold elements may be omitted in favor of a direct analog-to-digital (A/D) conversion in which, for example, the reset-state of the floating diffusion node is used to auto-zero a comparator within a single-slope ADC.

Figure 12:
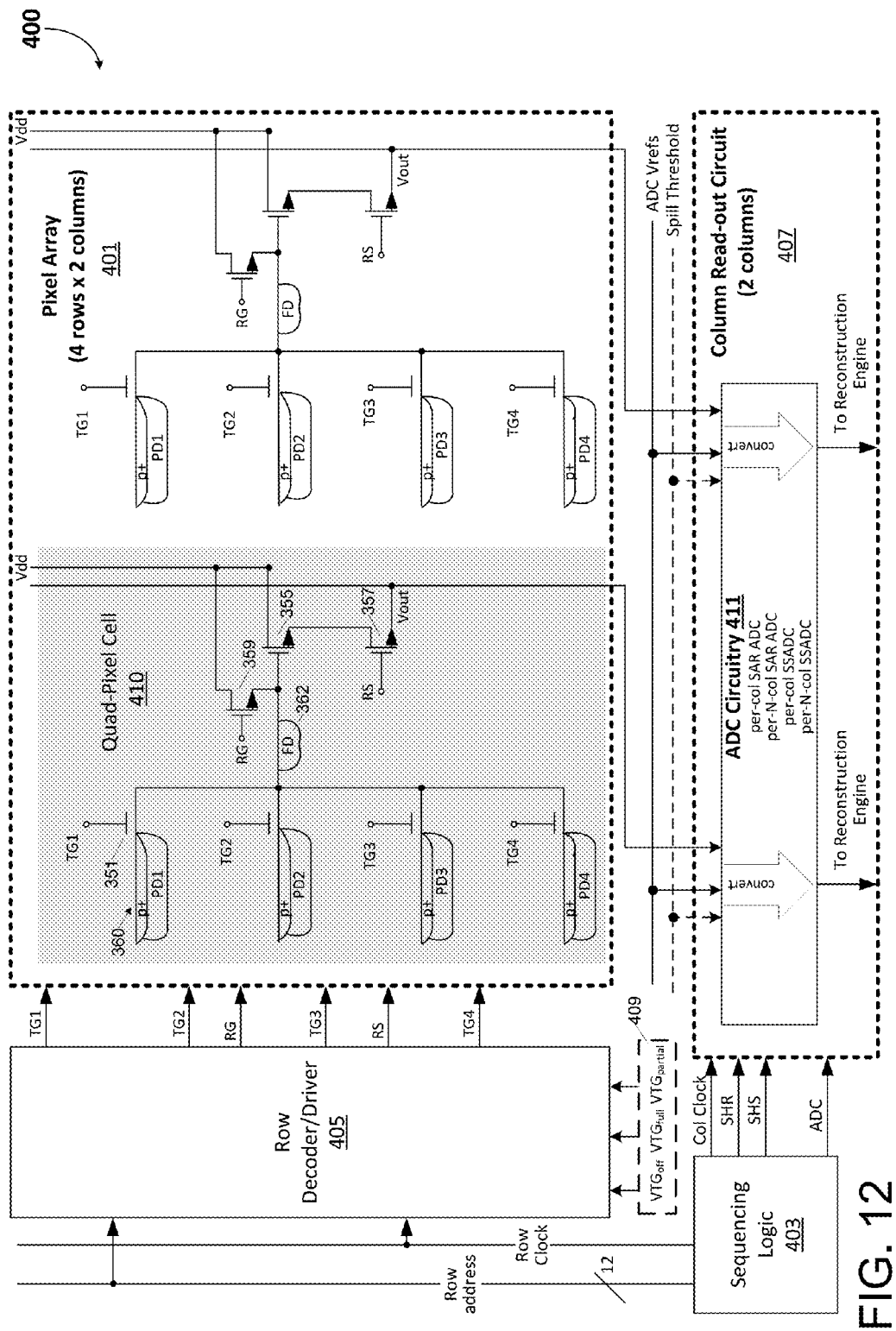
FIG. 12 illustrates an embodiment of an image sensor operable in fractional and full readout modes.

FIG. 12 illustrates an embodiment of an image sensor 400 operable in fractional and full readout modes and having a pixel array 401, sequencing logic 403, row decoder/driver 405 and column read-out circuit 407. Though not specifically shown, image sensor 400 may also include image reconstruction logic as discussed above in reference to FIGS. 6 and 7 to receive digitized readout results from column readout circuit 307 and produce a reconstructed image output. Also, while pixel array 401 is shown to include four rows and two columns of shared-element pixels, implemented embodiments will generally include many more pixel rows and columns to effect, for example, a multi-megapixel or gigapixel image sensor. The column read-out circuit 407 (for which two columns of read-out circuitry are depicted) and row decoder/driver 405 may likewise be scaled to meet the number of pixels in the pixel array.

In the embodiment shown, each column of the pixel array is populated by shared-element pixels in which every four pixels form a quad pixel cell 410 and contain respective photodiodes 360 (PD1-PD4) and transfer gates 351, but share a floating diffusion node 362, reset transistor 359, source-follower transistor 355 and row-select transistor 357. By this arrangement, the average transistor count per pixel is 1.75 (i.e., 7 transistors/4 pixels), thus effecting a relatively efficient, 1.75T-pixel image sensor. As shown, row decoder/driver 405 outputs a shared row-select signal (RS) and reset-gate signal (RG) to each row of quad-pixel cells 410, and outputs independent row transfer-gate control signals (TG1-TG4) to gate terminals of respective transfer gates 351. In an embodiment in which row decoder/driver 405 sequences incrementally through the rows of the array (e.g., pipelining integration and read-out operations with respect to the rows of pixel array 401 such that one row is read-out after another), the row decoder/driver may include logic to assert the RG, RS and TG signals at the appropriate time for each row (e.g., synthesizing those signals with respect to a row clock and row address from sequencing logic 403). Alternatively, row decoder/driver 405 may receive individual timing signals corresponding to each or any of the RG, RS and TG signals, multiplexing any individual enable pulse onto the corresponding RG, RS, or TG lines of a selected row at the appropriate time. In one embodiment, row decoder/driver 405 receives transfer-gate control voltages corresponding to the transfer-gate-off voltage, fractional-read voltage and full-read voltage shown in FIG. 11 (i.e., $VTG_{off}$, $VTG_{partial}$, $VTG_{full}$) from an on-chip or off-chip programmable voltage source 409, switchably coupling each of the different control voltages to a given transfer-gate row line at a deterministic time, for example, as shown in FIG. 11. In alternative embodiments, more than one voltage source 409 may be provided within image sensor 400 to enable transfer-gate control voltages to be locally calibrated and thus compensate for control-voltage and/or performance variations (i.e., non-uniformity) across the pixel array. Also, instead of (or in addition to) effecting different charge-transfer pulse magnitudes for the full and fractional readouts via pulse amplitude selection (i.e., switching between $VTG_{full}$ and $VTG_{partial}$ pulse levels for the full and fractional readouts), charge-transfer pulse widths may be varied from readout to readout (e.g., by circuitry within row decoder/driver 405 in accordance with control signals from sequencing logic 403 or other control circuitry within imaging sensor 400).

Still referring to the embodiment of FIG. 12, column read-out circuit 407 includes ADC circuitry 411 and, optionally, analog comparator circuitry to execute the full-read and fractional-read operations discussed above. In one implementation, a threshold comparator (i.e., for implementing the fractional-read spill-threshold discussed above) and A/D converter are implemented by separate circuits so that the pixel sample value (ADC result) may be generated concurrently with the overthreshold determination. Through this approach, the "spill threshold" may be dissociated from the reference signals ("ADC Vrefs") used in the ADC conversion, freeing the spill threshold and ADC reference voltages to be independently and dynamically adjusted (e.g., through reprogramming a threshold-reference generator) during or prior to sensor operation to achieve calibration and/or compensate for changing operating conditions or sub-optimal imaging results. In an alternative embodiment, the threshold comparator may be implemented as part of the ADC (e.g., using a reference applied in connection with resolving the digital sample value as the spill threshold), potentially reducing the footprint of the column read-out logic through more compact circuit design. Also, the threshold decision may be implemented in the digital domain after ADC operation (digitization) is completed, so that no modification of the ADC references or additional circuits are required. Further, to conserve power, ADC conversion may be skipped (omitted or bypassed) or aborted for pixels determined to be saturated or eclipsed (e.g., as signaled by a separate comparator or determined within the A/D converter circuitry itself).

In the embodiment shown, sequencing logic 403 delivers a column clock, sample-and-hold signals, SHR, SHS (i.e., applied to enable signal storage within optional sample-and-hold elements at the front-end of the ADC/threshold comparator), and compare/convert signal, ADC, to column read-out circuit 407 to enable the operational timing shown, for example, in FIG. 11. The ADC circuitry within column readout circuit 407 may be implemented, for example and without limitation, by a SAR (successive-approximation register) ADC per pixel column, a SAR ADC that is shared among N pixel columns (or all pixel columns), a single-slope ADC (SSADC) per pixel column, or a SSADC shared among N pixel columns (or all pixel columns).

Figure 13:
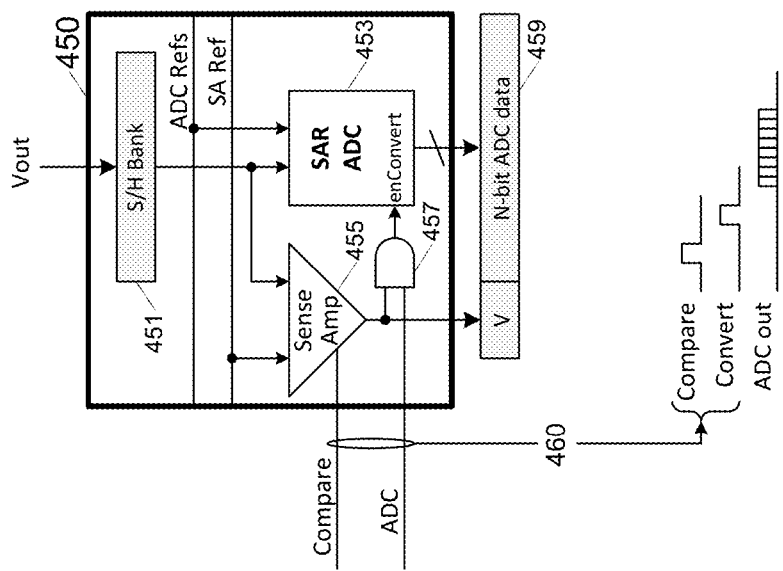
FIG. 13 illustrates successive-approximation-register (SAR) ADC circuitry that may be used to implement the per-column SAR ADC (or shared by N-columns SAR ADC) shown in FIG. 12.

FIG. 13 illustrates successive-approximation-register (SAR) ADC circuitry 450 that may be used to implement the per-column SAR ADC (or shared by N-columns SAR ADC) shown in FIG. 12. In the particular embodiment shown, a sense amplifier 455 is provided to enable detection of eclipsed and/or saturated pixels and thus suppress operation of a SAR ADC element 453 for such pixels, thereby avoiding unnecessary A/D conversion and saving power. In alternative embodiments, SAR ADC element 453 (i.e., the core A/D converter within circuitry 450) may receive one or more reference voltages that may be compared with the incoming pixel signal (e.g., from sample-and-hold bank or directly from the column output line (Vout)) to enable detection of eclipsed or saturated pixels and cease further ADC operation for such pixels. In any case, in the particular embodiment shown, a compare signal ("Compare") is provided to the sense amplifier to enable generation of a signal-valid bit. The signal-valid bit is supplied to logic gate 457 to gate the passage of an ADC-enable signal ("ADC") to the enable input of SAR ADC 453. Accordingly, when the output of sense amplifier 455 is low (indicating an output from sample-and-hold bank 451 that is not to be digitized), the ADC signal is blocked by logic gate 457 to prevent operation of SAR ADC 453. Conversely, when the output of sense amplifier 455 is high (signal-valid bit=logic '1'), the ADC signal propagates through logic gate 457 to trigger operation of the SAR ADC and thus enable generation of an N-bit ADC result. As shown, the signal-valid bit and N-bit ADC result may each be stored within an output buffer 459, with the signal-valid bit ('V') thus serving to indicate the validity or invalidity of the corresponding ADC data field within the buffer.

Figure 14:
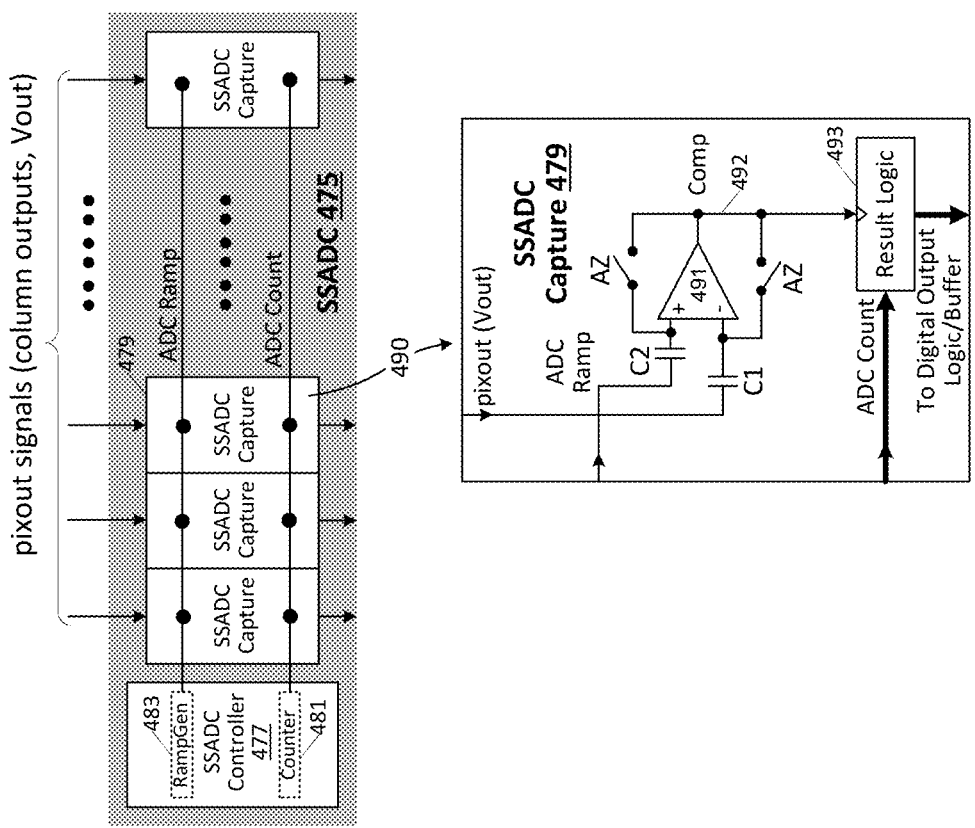
FIG. 14 illustrates a single-slope ADC (SSADC) that may be used to implement the per-column SSADC (or shared-by-N columns or even shared-by-all-pixel-columns SSADC) of FIG. 12.

FIG. 14 illustrates a single-slope ADC 475 that may be used to implement the per-column SSADC (or shared-by-N columns or even shared-by-all-pixel-columns SSADC) of FIG. 12. In the embodiment shown, single-slope ADC 475 ("SSADC") includes an SSADC controller 477 coupled to multiple per-column SSADC capture blocks 479, there being one such capture block 479 for each pixel column. SSADC controller 477 includes a counter 483 to increment through a sequence of ADC count values (also referred to herein as digital numbers or DNs) and a ramp generator 483 to generate an analog voltage ramp ("ADC ramp"), stepping or ramping from one analog voltage to the next as counter 481 steps from one ADC count to the next.

Referring to the exemplary implementation depicted in detail view 490, each SSADC capture block 479 includes a comparator 491, result logic 493 and capacitive elements, C1 and C2, and is coupled to receive the pixout signal for a respective pixel column and to receive the ADC ramp, ADC count and an auto-zero signal (AZ) from SSADC controller 477. Comparator 491 compares the incoming pixout signal (i.e., as output by the source-follower transistor of a selected pixel) and stepwise-incremented ADC ramp voltage, asserting a comparator-trip signal 492 ("Comp") in response to an ADC ramp step that exceeds the pixout signal level (i.e., ADC ramp step and pixout signal level that cross or change relative potential value with respect to each other from the initial start of measurement state). The comparator-trip signal 492 is delivered to result logic 493 which responsively captures the ADC count value that yielded the comparator trip event, thus effecting an A/D conversion. In the embodiment shown, result logic 493 outputs the A/D converted pixout sample(s) to a digital output logic buffer, which may perform additional operations with respect to pixel readout data before outputting data to image reconstruction logic. Also, result logic 493 may itself implement a number of processing or heuristic operations with respect to captured ADC count values (i.e., A/D conversion results), including clamping below-spill-threshold results to zero, applying digital gains to compensate for per-subframe variation in analog signal gain, etc.

To implement correlated double sampling (CDS) within the SSADC of FIG. 14, the floating diffusion reset-state (i.e., pixel floating diffusion potential immediately after reset) is accounted for in a preliminary "auto-zeroing" of comparator 491 to enable a subsequent clamping of the floating diffusion signal-state (i.e., floating diffusion potential after photocharge transfer from photodiode to floating diffusion node) that accounts for the floating diffusion reset-state. To auto-zero the comparator, an AZ signal (e.g., from sequencing logic 403 of FIG. 12) is pulsed to close switching elements (designated "AZ") that temporarily couple the signal input nodes of comparator 491 to the comparator's output node (492) and thereby clamp the comparator inputs to a "zero" or initial state voltage (in this example, conceptually the comparator offset voltage) while pixout is driven by the reset-state floating diffusion potential. This action preloads the potential across C1 according to the difference between the zero voltage and pixout reset-state signal so that a nominally identical reset-state component of the ensuing signal-state pixout signal will be canceled. Various other techniques may be employed to achieve CDS operation in conjunction with the SSADC of FIG. 14, including provision of sample-and-hold elements that yield a differential reset-state/signal-state output to the SSADC.

FIG. 15 illustrates an embodiment of a two-frame image reconstruction engine 521 or "image reconstructor" that may be used to implement two-frame reconstruction engine 225 of FIGS. 6 and 7. As shown, image reconstructor 521 receives pixel values corresponding to a long exposure (e.g., values read-out after an initial long subexposure) and a sum of short exposures—values read-out after multiple relatively brief subexposures and summed to yield a summed short exposure (SSE) pixel values and includes logic elements or circuitry to filter the summed short exposures (noise filter 523), determine a weighting value or "merge ratio" to be applied to the long exposure prior to exposure merging (merge ratio filter 525) and then merge the long exposure and noise-filtered summed-short exposures according to the merge ratio (exposure merge 527). The functions of each of these components are described in further detail below with respect to FIGS. 16-19.

FIG. 16 illustrates an exemplary embodiment of the noise filter (523) applied to the summed short exposures within the two-frame reconstruction engine 521 of FIG. 15. As shown, summed short-exposure pixel values corresponding to a same-color-plane neighborhood of nine pixels (e.g., spanning a 5×5 multi-color-plane pixel region as shown at 531) are applied as the filter input, with all input pixel values except those that differ from the subject pixel by more than a tabulated sigma value being averaged to produce a final filtered pixel output. More specifically, as shown in exemplary pseudocode listing 533, count and sum values (each of which is initialized to zero in line 10) are incremented and accumulated at lines 50 and 60, respectively, for each pixel value ($p_i$) that differs from a center pixel value ($p_5$) by not more than sigma value (obtained by indexing a sigma-noise lookup table 535 according to the brightness of the center pixel as shown in line 20), a determination established by the 'if' statement at line 40. By this operation, a sum of all pixel values within sigma of the center pixel is generated together with a count of the number of such pixels. As shown at line 90, the sum is divided by the count to produce the sigma-filtered average. Although sigma is determined (e.g., looked up) as a function of the value of the center pixel in the depicted embodiment, sigma may alternatively be determined based on values of one or more neighboring pixels in addition to or instead of the value of the center pixel.

FIG. 17 illustrates an embodiment of the merge ratio filter logic 525 within two-frame image reconstructor 521 of FIG. 15. Merge ratio logic receives the summed short exposure pixel values and long exposure pixel values as generally discussed above (the noise-filtered summed short exposure values may alternatively be used) and generates—using a closeness lookup table 541—a merge ratio to be applied to the long exposure values prior to their merge with the summed short exposure values. More specifically, as shown in the exemplary flow diagram at 543, for each subject pixel 'i', a local merge ratio value is initialized to zero at 547. If the long exposure pixel value exceeds the saturation threshold (an affirmative determination at 549 as may be indicated by an encoding of the pixel value itself and/or from a status flag), then the local merge ratio value remains zero and is applied within a 3×3 erode function at 561 (i.e., a determination of the minimum of the local ratios for a 3×3 neighborhood of adjacent pixels centered about the subject pixel) to yield a final, output merge ratio value (thus saturated long exposure pixels result in a 3×3 surround where only short exposure values will contribute to the final image). Otherwise, at 551, the long exposure value is scaled by the ratio of long and summed-short exposure durations to yield a scaled long exposure value (sc_long_exp). At 553, the closeness lookup table (541) is indexed using the summed short exposure value to retrieve an allowed difference value (or minimum "closeness" value) for that pixel intensity and, at 555, the absolute value of the difference (i.e., difference magnitude) between the summed short exposure pixel value and scaled long exposure pixel value is determined. Though not specifically shown, noise filtering may be performed on both the summed short exposure and scaled long exposure values prior to the closenessLUT lookup and the difference-magnitude calculation (e.g., weighted blur filter applied to local N×N neighborhood of like-color pixels (5×5, 9×9, etc.) in either or both of the long exposure and summed short exposure). At 557, a raw merge ratio value is generated based on the ratio of the difference magnitude and the allowed difference value, and at 559, the raw merge ratio value is clipped to a range between unity (1) and the minimum difference value to yield a finalized local merge ratio. Thereafter, at 561, the 3×3 erode function is applied as described above to produce the output merge ratio.

FIG. 18 illustrates an exemplary exposure merge operation carried out using the filtered short exposure value, long exposure value and the merge ratio value from the merge ratio filter logic of FIG. 17. As shown, the exposure merge is implemented by summing the filtered sum-of-short-exposures value with a merge-ratio-scaled long exposure value, with the merged result (i.e., sum of filtered short exposure and scaled long exposure) being further scaled by the ratio of the frame duration (i.e., sum of short and long exposure durations) and a sum of the short exposure duration and a merge-ratio-scaled long exposure duration. Various other exposure merging functions may be implemented in alternative embodiments. The conceptual result of this merging approach is to rely more heavily on the long exposure when the scaled intensity between the two exposures is similar, while relying less on the long exposure when the difference in scaled intensity between the two exposures is more than would be expected for random noise effects (i.e., because of motion in the scene).

FIG. 19 illustrates an exemplary sequence of operations executed to initialize the closeness lookup table and sigma-noise lookup table within the two-frame reconstruction engine shown in FIG. 15. In one embodiment, the lookup table initialization is executed at image sensor startup (or as part of periodic or adaptive calibration) within the image sensor itself. In alternative embodiments, the image sensor may present a programming interface that enables the closeness and sigma-noise LUTs to be loaded by an external processor (e.g., an image processor chip or other specialpurposes or general purpose processor within a camera or electronic device having a camera function). In the particular embodiment shown, both the closeness LUT and sigma-noise LUT are sequentially loaded with brightness-indexed noise values scaled by respective closeness and sigma-noise scale factors. That is, for each pixel value (representative of scene brightness) ranging from 0 to a maximum possible sum-of-short-exposures value, a brightness-dependent noise value, "Noise[i]" is calculated and then scaled by LUT scale factor (CLScaleFactor or σNScaleFactor for the closeness LUT and sigma-noise LUT, respectively) to yield respective closeness and sigma-noise LUT values.

In the implementation shown, Noise[i] is a total noise value obtained as the square root of the summed squares of the photon shot noise, full-read noise and fractional read noise components. Moreover, while the full read noise is independent of the brightness level, the fractional read noise only applies to those short exposures that will yield nonzero fractional readouts at a given brightness level. The particular example shown assumes three short exposures (there may be more or fewer short exposures in alternative embodiments) so that either zero, one or two fractional readouts may occur per subframe (i.e., the maximum number of fractional readouts corresponding to the number of intermediate short subframes). Accordingly, if the pixel value 'i' will yield a fractional readout after the first short subframe (i.e., 'i' is greater than the read threshold multiplied by the ratio of the sum-of-short subframe duration divided by the first short subframe duration), then two fractional readouts will occur—one after the first short subframe and another after the second short subframe—so that the fractional read noise will be incurred twice (NumFractRead[i]=2). If the pixel value will yield a fractional readout after the second short subframe, but not the first (i.e., 'i' is greater than the read threshold multiplied by the ratio of the sum-of-short-subframe duration divided by the sum of the durations of the first and second short subframes), then only a single fractional read noise is incurred (NumFractRead[i]=1). Otherwise if the pixel value is insufficient to trigger fractional readouts in either of the first two short subframes (again, in this three short-subframe example), then no fractional read noise is incurred (NumFractRead[i]=0). Accordingly, the total readout noise varies across the sum-of-short-exposure pixel value range, so that the closeness and sigma-noise LUT tables reflect not only the brightness-indexed photon shot noise, but also the thresholds above which one or two fractional readouts occur.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific voltages, pixel array sizes, signal path widths, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "light" as used to apply to radiation is not limited to visible light, and when used to describe sensor function is intended to apply to the wavelength band or bands to which a particular pixel construction (including any corresponding filters) is sensitive. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of operation within an integrated-circuit image sensor having a pixel array, the method comprising:
   after a first exposure interval that constitutes a first fraction of a frame interval, reading out of the pixel array first signals representative of total photocharge integrated within respective pixels during the first exposure interval;
   after a second exposure interval that constitutes a second fraction of the frame interval, reading out of the pixel array second signals representative of photocharge integrated within the pixels in excess of a threshold level, including removing the photocharge in excess of the threshold level from the pixels and leaving residual photocharge within the pixels; and
   after a third exposure interval that constitutes a third fraction of the frame interval and transpires after the second exposure interval, reading out of the pixel array third signals representative of a combination of at least the residual photocharge and photocharge integrated within the pixels during the third exposure interval.

2. The method of claim 1 wherein the residual photocharge within the pixels after reading out the second signals comprises a level of photocharge up to but not in excess of the threshold level.

3. The method of claim 1 further comprising storing subframe image data corresponding to the second signals and adding thereto subframe image data corresponding to the third signals to yield image data representative of photocharge integrated during at least the second and third exposure intervals.

4. The method of claim 1 further comprising digitizing the second signals to yield first subframe image data, digitizing the third signals to yield second subframe image data and conditionally adding individual digital pixel values within the first subframe image data to individual digital pixel values within the second subframe image data to produce image data representative of photocharge integrated within the pixel array during at least the second and third exposure intervals.

5. The method of claim 4 wherein conditionally adding the individual digital pixel values within the first subframe image data to the individual digital pixel values within the second subframe image data comprises comparing the individual digital pixel values within the second subframe image data to a digital threshold to validate corresponding individual digital pixels within the first subframe image data.

6. The method of claim 1 further comprising generating, from the second signals, subframe image data corresponding to the second exposure interval, including:
   digitizing a plurality of the second signals to yield respective digital pixel values;
   comparing each of the digital pixel values against a digital threshold; and
   setting each of the digital pixel values that does not exceed the digital threshold to a predetermined value.

7. The method of claim 1 wherein a ratio of the third exposure interval to the second exposure interval corresponds to a ratio of a maximum valid level of the second signals to a maximum valid level of the third signals.

8. An integrated-circuit image sensor comprising:
   a pixel array; and
   readout circuitry to:
      read out of the pixel array, after a first exposure interval that constitutes a first fraction of a frame interval, first signals representative of total photocharge integrated within respective pixels during the first exposure interval;
      read out of the pixel array, after a second exposure interval that constitutes a second fraction of the frame interval, second signals representative of photocharge integrated within the pixels in excess of a threshold level, including removing the photocharge in excess of the threshold level from the pixels and leaving residual photocharge within the pixels; and
      read out of the pixel array, after a third exposure interval that constitutes a third fraction of the frame interval and transpires after the second exposure interval, third signals representative of a combination of at least the residual photocharge and photocharge integrated within the pixels during the third exposure interval.

9. The integrated-circuit image sensor of claim 8 wherein the residual photocharge within the pixels after reading out the second signals comprises a level of photocharge up to but not in excess of the threshold level.

10. The integrated-circuit image sensor of claim 8 further comprising reconstruction circuitry to store subframe image data corresponding to the second signals and add thereto subframe image data corresponding to the third signals to yield image data representative of photocharge integrated during at least the second and third exposure intervals.

11. The integrated-circuit image sensor of claim 8 wherein the readout circuitry further comprises digital logic to digitize the second signals to yield first subframe image data, digitize the third signals to yield second subframe image data and conditionally add individual digital pixel values within the first subframe image data to individual digital pixel values within the second subframe image data to produce image data representative of photocharge integrated within the pixel array during at least the second and third exposure intervals.

12. The integrated-circuit image sensor of claim 11 wherein the digital logic to conditionally add the individual digital pixel values within the first subframe image data to the individual digital pixel values within the second subframe image data comprises logic to compare the individual digital pixel values within the second subframe image data to a digital threshold to validate corresponding individual digital pixels within the first subframe image data.

13. The integrated-circuit image sensor of claim 8 wherein the readout circuitry further comprises digital logic to generate, from the second signals, subframe image data corresponding to the second exposure interval, including logic to:
   digitize a plurality of the second signals to yield respective digital pixel values;
   compare each of the digital pixel values against a digital threshold; and
   set each of the digital pixel values that does not exceed the digital threshold to a predetermined value.

14. The integrated-circuit image sensor of claim 8 wherein a ratio of the third exposure interval to the second exposure interval corresponds to a ratio of a maximum valid level of the second signals to a maximum valid level of the third signals.

* * * * *